United States Patent [19]

Yamaki et al.

[11] Patent Number: 5,431,013
[45] Date of Patent: Jul. 11, 1995

[54] ENGINE EXHAUST APPARATUS

[75] Inventors: Yasuhito Yamaki, Tokyo; Hiroaki Kaneko, Ageo; Katsumi Nakazato, Iwatsuki; Yoshimitsu Tateno, Nogi, all of Japan

[73] Assignee: Fuji Jukogyo Kabushiki Kaisha, Tokyo, Japan

[21] Appl. No.: 170,751

[22] Filed: Dec. 21, 1993

[30] Foreign Application Priority Data

Jan. 11, 1993 [JP] Japan .................... 5-002762
Jan. 11, 1993 [JP] Japan .................... 5-002763
Jan. 14, 1993 [JP] Japan .................... 5-005333

[51] Int. Cl.6 ........................................ F01N 3/20
[52] U.S. Cl. ........................... 60/289; 60/293; 60/298; 60/308; 181/256; 181/262
[58] Field of Search ............ 60/289, 293, 298, 299, 60/302, 307, 308; 181/256, 262, 272

[56] References Cited

U.S. PATENT DOCUMENTS

| | | | |
|---|---|---|---|
| 3,999,383 | 12/1976 | Hanaoka | 60/289 |
| 4,099,377 | 7/1978 | Yoshimura | 60/289 |
| 4,312,313 | 1/1982 | McWhorter | 60/304 |
| 4,319,452 | 3/1982 | Morita | 60/293 |
| 4,579,194 | 4/1986 | Shiki | |
| 4,590,762 | 5/1986 | Mifuji | 60/293 |
| 4,894,987 | 1/1990 | Harwood | 60/299 |

Primary Examiner—Ira S. Lazarus
Assistant Examiner—Daniel J. O'Connor
Attorney, Agent, or Firm—Beveridge, DeGrandi, Weilacher & Young

[57] ABSTRACT

An engine exhaust apparatus comprises a sound suppressing section for lowering the exhaust noise level as an exhaust gas discharged from the exhaust port passes through it. The exhaust apparatus is provided with an ejector section for introducing secondary air into the exhaust gas delivered from the sound suppressing section and mixing the gases, and a post-treatment section for purifying the gas mixture delivered from the ejector section. The exhaust gas discharged from an exhaust manifold gets into the ejector section through the sound suppressing section, and is then purified in the post-treatment section. Therefore, the ejector effect cannot be reduced by the sound suppressing section which is subject to high flow resistance. Thus, the exhaust noise level can be lowered with the ejector effect of the introduction of the secondary air improved considerably, and low cost and simple construction can be enjoyed.

13 Claims, 12 Drawing Sheets

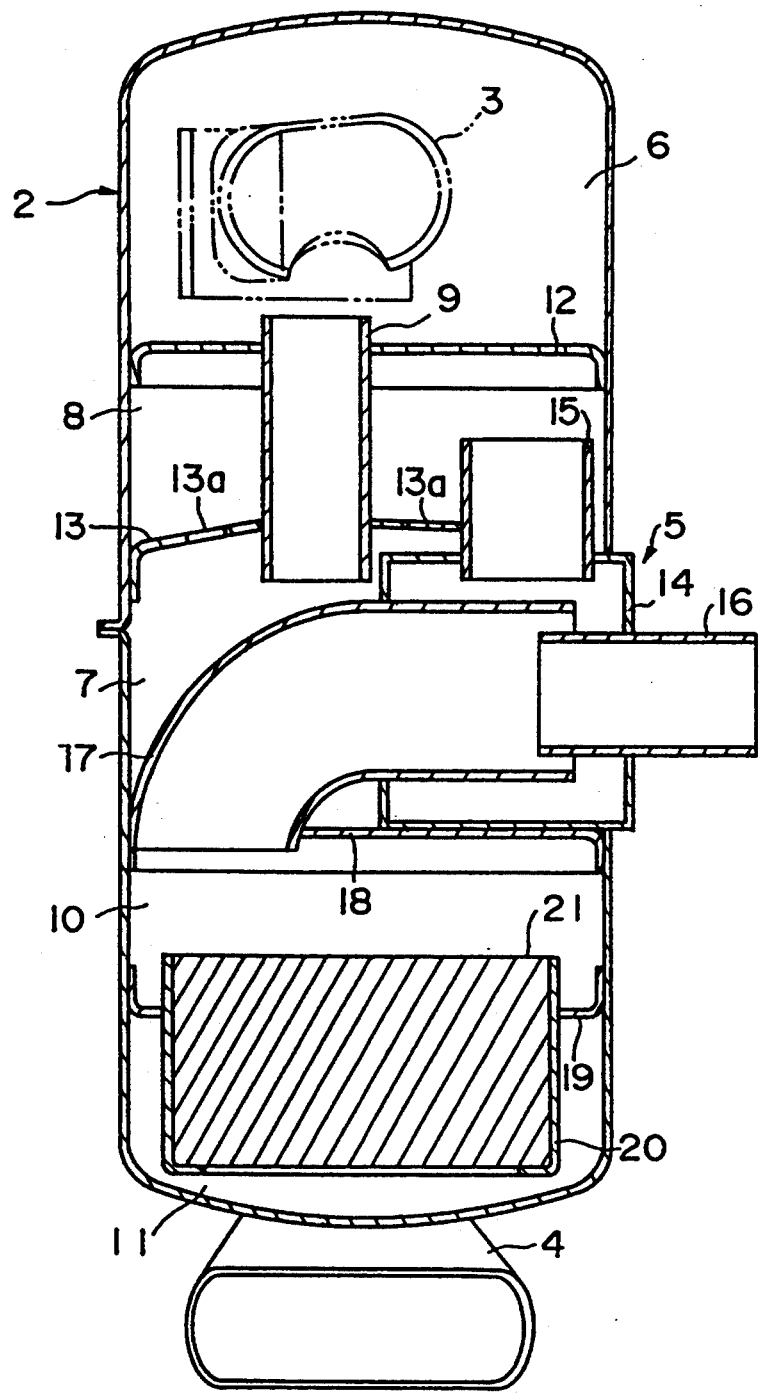
F I G. 1

ENGINE EXHAUST APPARATUS

BACKGROUND OF THE INVENTION

1. Field of the Invention

The present invention relates to an engine exhaust apparatus for purifying exhaust gases, and more specifically, to an engine exhaust apparatus in which secondary air is introduced into the exhaust gas to accelerate purification of the exhaust gas by means of a catalyst or the like.

2. Information of the Related Art

Conventionally known is a technique in which secondary air is introduced into the exhaust gas delivered from an engine, whereby exhaust gas purification is accelerated in a post-treatment device, such as a catalyst or thermal reactor.

As a means for introducing the secondary air, there is a pump or some other auxiliary equipment in which the secondary air is positively fed into the exhaust gas. According to this arrangement, however, the flow of the secondary air must be controlled by means of a throttle valve or the like so that the secondary air intake corresponds to the exhaust gas delivery. This control operation is complicated, and the whole apparatus is inevitably large-sized, thus entailing high cost.

Another secondary air introducing means is designed so as to feed the secondary air by utilizing the ejector effect which is produced during the discharge of the exhaust gas. This is a simple structure which can introduce the secondary air at a rate corresponding to the exhaust gas delivery. Accordingly, this means is widely used in various engines.

An example of the means which utilizes the ejector effect is described in U.S. Pat. No. 3,468,124. In this case, an ejector section for introducing the secondary air by utilizing the ejector effect is provided on the upstream of an exhaust manifold. A muffler for lowering the exhaust noise level is arranged on the downstream of the ejector section.

Since the muffler with high flow resistance is arranged on the downstream of the ejector section, however, a satisfactory ejector effect cannot be obtained in introducing the secondary air.

Since the negative-pressure components of the exhaust pressure of the engine are minor, as shown in FIG. 9, moreover, the ejector effect is inevitably lowered by the positive-pressure components of the exhaust pressure.

Moreover, the body of the muffler is heated by the reaction heat between the exhaust gas and the secondary air with the aid of the catalyst, so that there are some problems on durability, including oxidative deterioration. Furthermore, the sounds of sudden expansion of the exhaust gas during its discharge are emanated through a secondary air intake passage to the outside, thus constituting exhaust noises.

SUMMARY OF THE INVENTION

A first object of the present invention is to provide an engine exhaust apparatus, capable of greatly improved ejector effect of the introduction of secondary air, and enjoying low cost and simple construction.

A second object of the present invention is to provide an engine exhaust apparatus, capable of supplying a proper quantity of secondary air to an exhaust system with use of a simple arrangement, and enjoying various advantages including lower cost, lower exhaust noise level, improved durability ensured by restraining high-temperature oxidative deterioration of a muffler body, and higher reliability.

According to an aspect of the present invention, there is provided an engine exhaust apparatus purifying an exhaust gas discharged from an exhaust port of an engine and lowering the exhaust noise level, comprising:

a sound suppressing section for lowering the exhaust noise level as the exhaust gas discharged from the exhaust port passes through the sound suppressing section;

an ejector section for introducing secondary air into the exhaust gas delivered from the sound suppressing section and mixing the secondary air and the exhaust gas; and a post-treatment section for purifying the gas mixture delivered from the ejector section.

Thus, according to the present invention, the exhaust gas discharged from an exhaust manifold gets into the ejector section after passing through the sound suppressing section, and is then purified in the post-treatment section. In contrast with the conventional case, therefore, the ejector effect cannot be lowered by the sound suppressing section which is subject to high flow resistance.

Accordingly, the exhaust noise level can be lowered with the ejector effect of the introduction of the secondary air improved considerably, and low cost and simple construction can be enjoyed.

According to another aspect of the present invention, there is provided an engine exhaust apparatus for purifying an exhaust gas discharged from an exhaust port of an engine and lowering the exhaust noise level, the apparatus comprising:

a cover member covering at least a part of the body of the exhaust apparatus in such a manner that an intake passage for introducing secondary air is defined between the cover member and the apparatus body;

sound suppressing means set in the intake passage;

an ejector section for feeding the secondary air from the intake passage into the exhaust gas discharged from the exhaust port and mixing the secondary air and the exhaust gas; and a post-treatment section for purifying the gas mixture delivered from the ejector section.

Thus, according to the present invention, the sound suppressing means is provided outside the exhaust apparatus body, so that the ejector effect cannot be lowered by the sound deadening means which is subject to high flow resistance. Accordingly, the exhaust noise level can be lowered with the ejector effect of the introduction of the secondary air improved considerably, and low cost and simple construction can be enjoyed.

Moreover, the intake passage for introducing the secondary air is defined outside the exhaust apparatus body. Accordingly, the construction of the apparatus is simple, and the apparatus body can be cooled during the introduction of the secondary air, so that oxidative deterioration of the exhaust apparatus is restrained, and the durability of the apparatus is improved.

Furthermore, the sound suppressing means is interposed between the exhaust apparatus and the cover member which covers at least a part of the outer periphery of the apparatus. Thus, the sounds of sudden expansion of the exhaust gas cannot be easily emanated to the outside, so that the noise level of the exhaust system can be lowered.

BRIEF DESCRIPTION OF THE DRAWINGS

FIG. 1 is a sectional view of an engine exhaust apparatus according to a first embodiment of the present invention;

DETAILED DESCRIPTION OF THE PREFERRED EMBODIMENTS

Preferred embodiments of the present invention will become understood from the following detailed description referring to the accompanying drawings.

Referring now to FIGS. 1 to 5, an exhaust apparatus according to a first embodiment of the present invention will be described.

Figure 2:
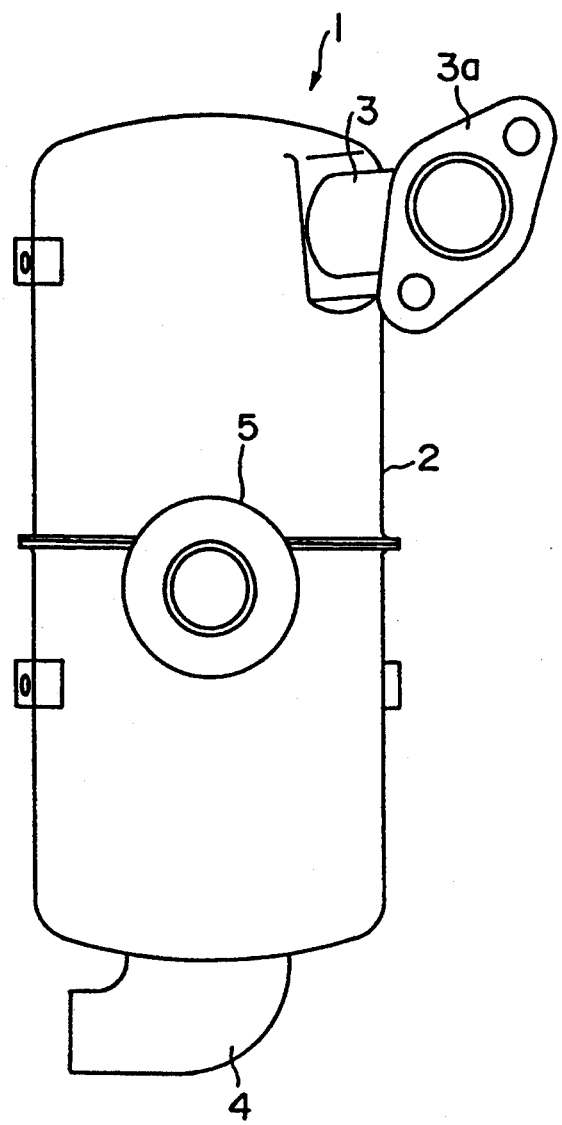
FIG. 2 is an exterior view of the exhaust apparatus shown in FIG. 1.

In this exhaust apparatus 1, as shown in FIG. 2, a manifold 3 is attached to an end of a cylindrical muffler body 2 so as to communicate therewith inside. An exhaust port of an engine (not shown) is connected to a flange 3a at an end of the manifold 3.

An exhaust pipe 4 is mounted on the other end of the muffler body 2 so that purified exhaust gas is discharged through the pipe 4 into the atmosphere. An ejector section 5 is located substantially in the center of the muffler body 2, and secondary air is introduced into the body 2 through the section 5.

As shown in FIG. 1, the muffler body 2 includes a sound suppressing section. The sound suppressing section comprises of a first expansion chamber 6 communicating with the manifold 3, a second expansion chamber 7 communicating with the first chamber 6 by means of a guide pipe 9, and a third expansion chamber 8 defined between the first and second chambers 6 and 7 and communicating with the second chamber. Further, the muffler body 2 includes a catalyst chamber 10, defined adjacent to the second expansion chamber 7, and an exhaust chamber 11 into which the exhaust pipe 4 opens.

The first and third expansion chambers 6 and 8 are divided by a partition plate 12, and the third and second expansion chambers 8 and 7 by a partition plate 13. The opposite open ends of the guide pipe 9 are fixed to the partition plates 12 and 13, individually, so that the first and second expansion chambers 6 and 7 communicate with each other via the pipe 9. The second and third expansion chambers 7 and 8 communicate with each other through a number of holes 13a in the partition plate 13.

The ejector section 5 is housed in the second expansion chamber 7. The section 5 comprises a cylindrical swivel barrel 14, an exhaust gas intake pipe 15 connecting the barrel 14 and the third expansion chamber 8, an air intake pipe 16 for introducing the secondary air from the outside, and an elbow-shaped diffuser pipe 17 for mixing the secondary air and the exhaust gas and guiding the resulting mixture into the catalyst chamber 10.

Figure 3:
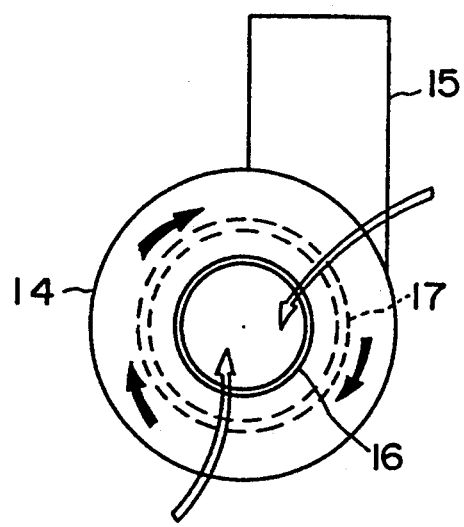
FIG. 3 is a plan view of an ejector section attached to the exhaust apparatus shown in FIG. 1.

The exhaust gas intake pipe 15 penetrates the partition plate 13, and its one end opens into the third expansion chamber 8. As shown in FIG. 3, the other end of the pipe 15 opens into the swivel barrel 14. The pipe 15 intersects the barrel 14 at right angles thereto with an offset with respect to the central axis of the barrel 14.

The air intake pipe 16 penetrates the outer wall of the swivel barrel 14, and is fixed to the barrel 14 so as to be coaxial therewith. In the barrel 14, the pipe 16 is located in the barrel 14 so as to be coaxial with a straight portion of the diffuser pipe 17 which is larger in diameter than the pipe 16.

The straight portion of the diffuser pipe 17 is fixed coaxially to the swivel barrel 14. A bent portion of the pipe 17 which extends in the second expansion chamber 7 penetrates the partition plate 18 and opens into the catalyst chamber 10.

The catalyst chamber 10 is divided from the exhaust chamber 11 by the partition plate 19. A catalyst (oxidation catalyst) 21 of low flow resistance is contained in a catalyst holder 20, which is attached to the partition plate 19. The exhaust gas purified by the catalyst 21 is discharged into the atmosphere via the exhaust chamber 11 and the exhaust pipe 4.

The following is a description of the operation of the exhaust apparatus 1 according to the first embodiment of the present invention.

When the engine is started, the exhaust gas delivered from the engine is discharged into the first expansion chamber 6 through the manifold 3. Then, the gas is discharged into the second expansion chamber 7 through the guide pipe 9. Further, the exhaust gas is throttled by means of the holes 13a in the partition plate 13 over the second chamber 7 as it is introduced into the third expansion chamber 8. In this manner, the exhaust gas delivered from the engine repeats expansion and contraction, so that the exhaust noise level can be efficiently lowered with use of the small-capacity sound deadening section.

Subsequently, the exhaust gas from the third expansion chamber 8 is introduced into the swivel barrel 14 through the exhaust gas intake pipe 15 of the ejector section 5. Since the pipe 15 extends at right angles to the central axis of the barrel 14, as shown in FIG. 3, the exhaust gas in the barrel 14 swirls in an accelerating flow.

Figure 4:
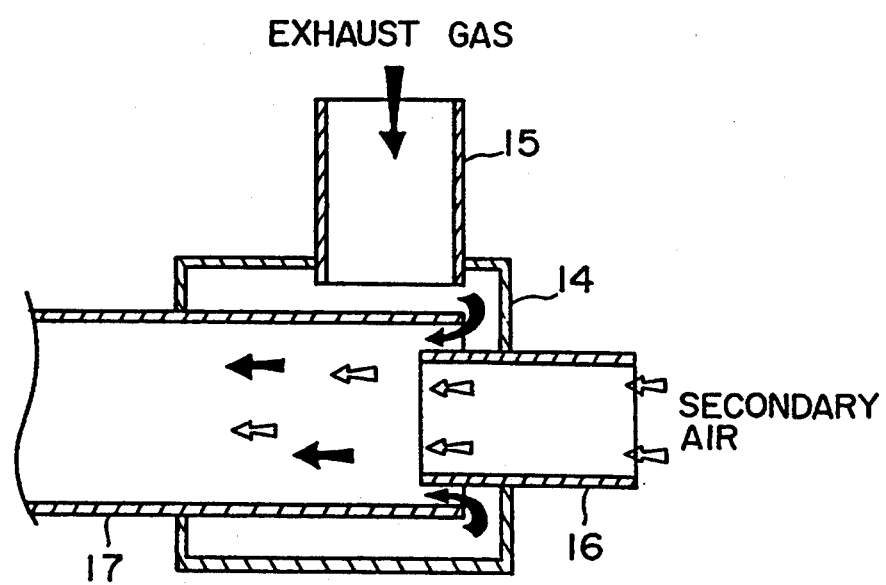
FIG. 4 is a sectional view of the ejector section.

After swirling in the swivel barrel 14, the exhaust gas gets into the diffuser pipe 17 through an annular gap formed between the respective openings of the pipe 17 and the air intake pipe 16, as shown in FIG. 4. Thereupon, the speed of the exhaust gas flow is further increased to produce a negative pressure, whereby fresh external air (secondary air) is sucked in through the pipe 16.

Thereafter, the exhaust gas and the secondary air are mixed in the diffuser pipe 17, and the resulting gas mixture is discharged into the catalyst chamber 10 and gets into the catalyst 21. Hydrocarbon and carbon monoxide, poisonous gases, are eliminated by oxidation in the catalyst 21, and are discharged into the atmosphere through the exhaust pipe 4.

Figure 5:
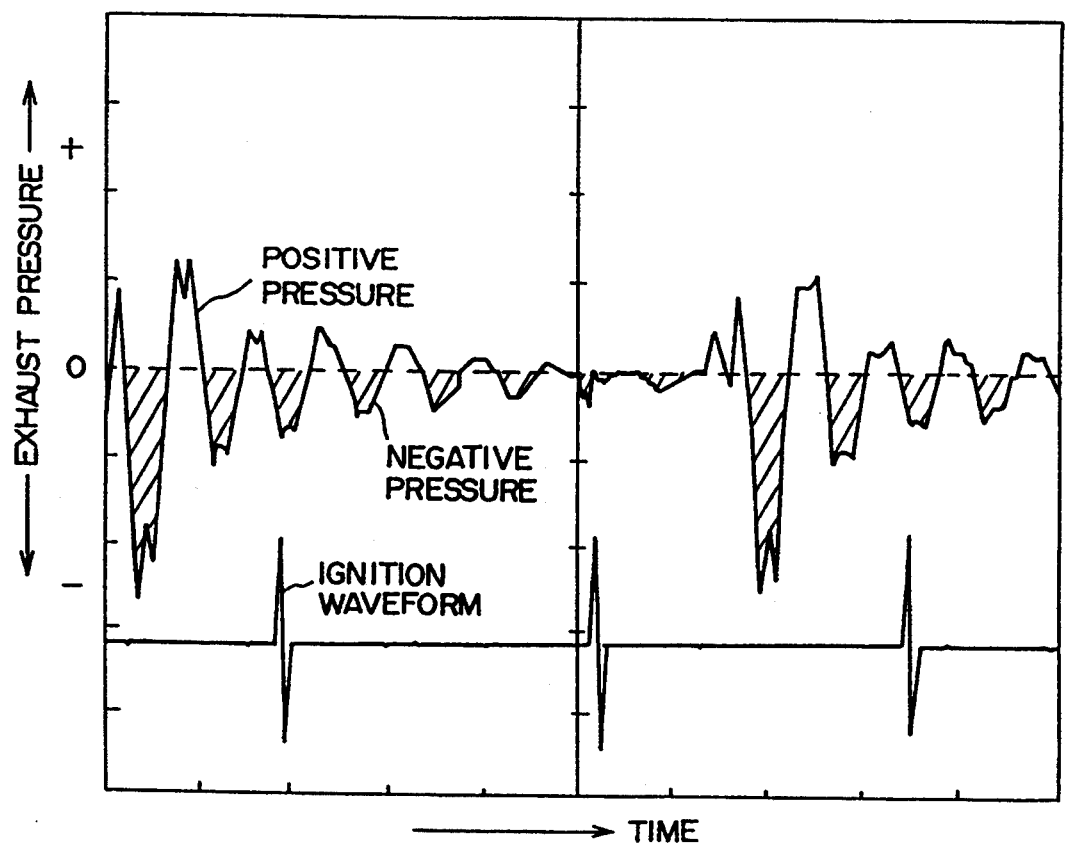
FIG. 5 is a graph illustrating the relationships between time and exhaust pressure produced in the ejector section.

The sound suppressing section, thus composed of the first, second, and third high-resistance expansion chambers 6, 7 and 8, is located on the upper-course side of the ejector section 5. In this arrangement, the exhaust pressure of the engine can be utilized effectively, that is, the negative pressure produced in the ejector section 5 can be augmented, as shown in FIG. 5, so that the intake of the secondary air can be increased by a large margin.

Thus, the engine noise level can be lowered with high efficiency, and the ejector effect can be heightened to improve the exhaust gas purifying capability considerably. Also, the whole apparatus can be reduced in size.

Figure 6:
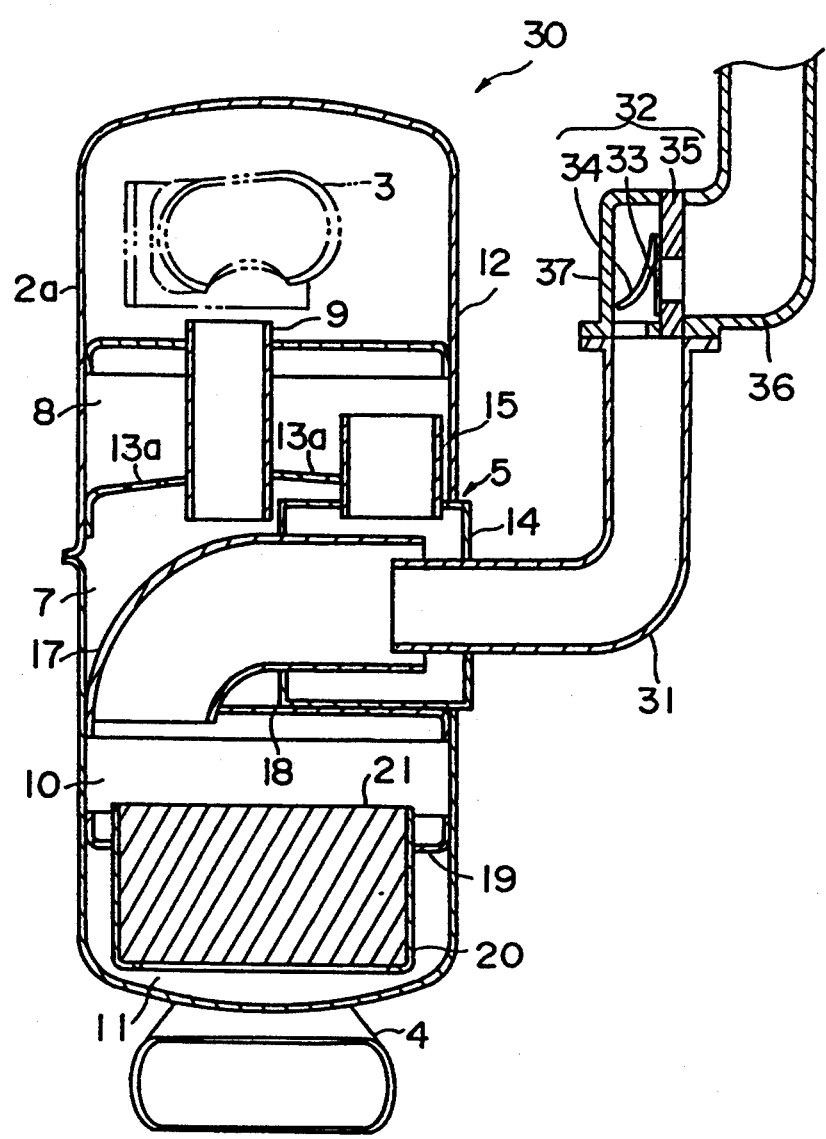
FIG. 6 is a sectional view of an engine exhaust apparatus according to a first modification of the first embodiment.

Referring now to FIG. 6, an exhaust apparatus according to a first modification of the first embodiment will be described.

In this first modification, a check valve is provided on the secondary air intake side, in order to make the ejector effect higher than that of the exhaust apparatus 1 of the first embodiment. In the description of several embodiments to follow, like reference numerals are used to designate the same members as the ones in the first embodiment, and a description of those members is omitted.

In the exhaust apparatus 30 of this modification, as shown in FIG. 6, an air intake pipe 31 is formed by extending the atmosphere-side end of the air intake pipe 16 of the ejector section 5 according to the first embodiment. The check valve 32 is provided in the extended end of the pipe 31. The valve 32 is integrally formed of a reed valve 33, a stopper 34, and a seat 35. The check valve 32 is held between an intake pipe 36 and a cover member 37, coupled together therewith by fasteners, such as bolts or the like, and connected to the extreme end of the air intake pipe 31.

Figure 9:
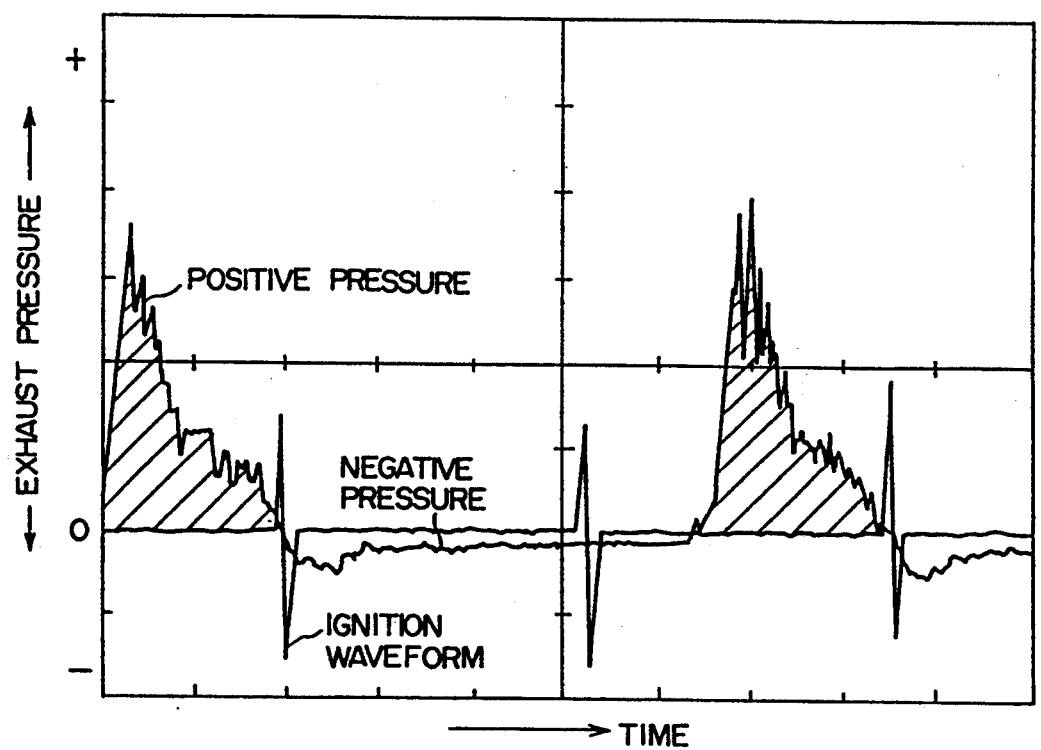
FIG. 9 is a graph illustrating the relationships between time and engine exhaust pressure.

As shown in FIG. 9, the exhaust pressure of the engine consists mainly of positive-pressure components. The check valve 32 can prevent the positive pressure from discharging the unpurified exhaust gas into the atmosphere through the air intake pipe 31. Thus, the ejector effect can be heightened, and the secondary air can be introduced effectively. Other functions and effects are the same as those of the foregoing first embodiment.

Figure 7:
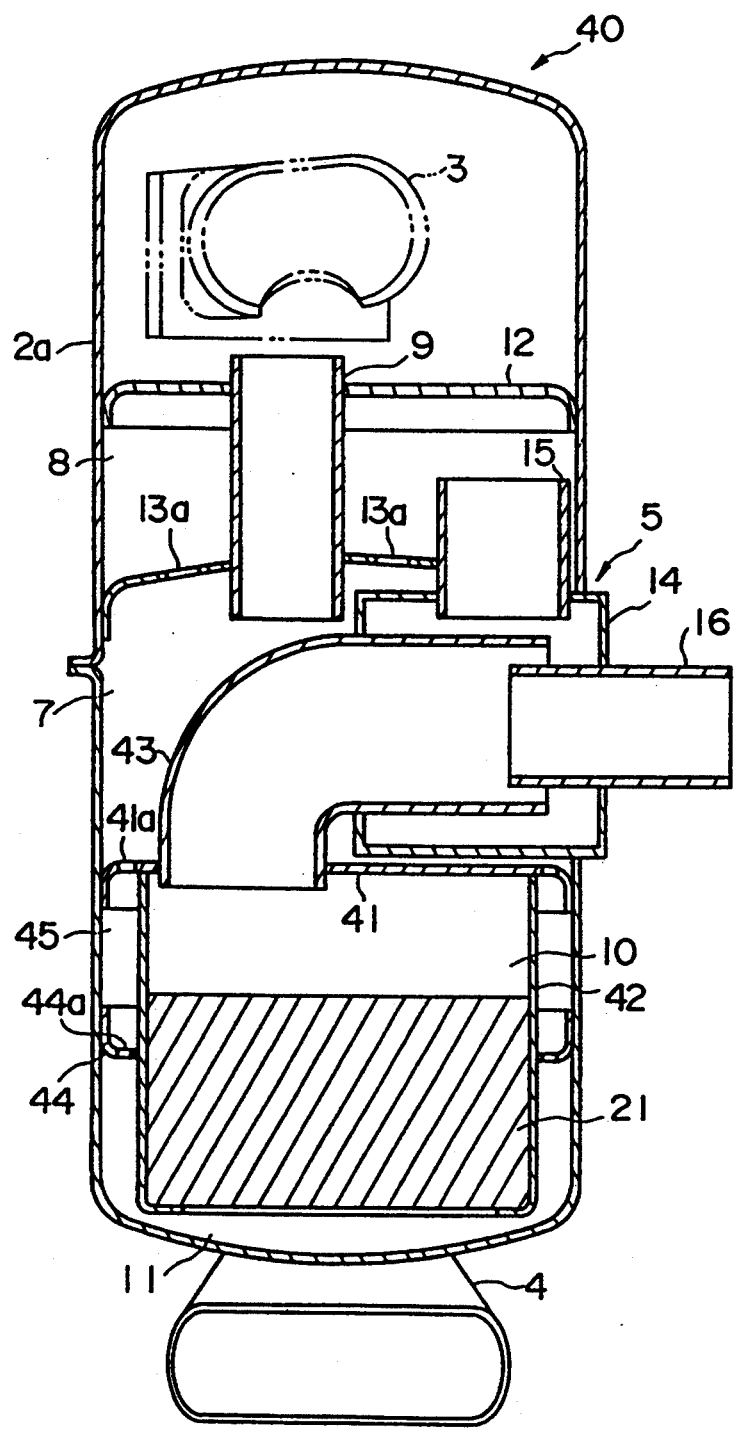
FIG. 7 is a sectional view of an engine exhaust apparatus according to a second modification of the first embodiment.

Referring now to FIG. 7, an exhaust apparatus according to a second modification of the first embodiment will be described.

In this second modification, as compared with the exhaust apparatus 1 of the first embodiment, the ambience of the catalyst 21 is cooled in order to prevent thermal damage by the heat of reaction from the catalyst 21.

In the exhaust apparatus 40 of this modification, as shown in FIG. 7, the peripheral edge of a catalyst holder 42 extends so as to abut against a partition plate 41 (corresponding to the partition plate 18 of the first embodiment) at the bottom of the second expansion chamber 7. The peripheral edge of the holder 42 defines the catalyst chamber 10 into which a diffuser pipe 43 of the ejector section 5 opens.

In FIG. 7, the diffuser pipe 43 slightly differs from the diffuser pipe 17 of the first embodiment only in the shape of the elbow-shaped bend. Alternatively, however, the ejector section 5 may be laterally extended to some degree so that the mounting position of the diffuser pipe can be shifted.

A fourth expansion chamber 45 is defined by a spacer which is surrounded by an outer casing 2a, the partition plate 41, the side wall of the catalyst holder 42, and a partition plate 44 on which the holder 42 is mounted.

The partition plate 41 has a hole 41a which is situated between the outer casing 2a and the outer wall of the catalyst holder 42. Likewise, the partition plate 44 has a hole 44a which is situated between the casing 2a and the outer wall of the holder 42. The holes 41a and 44a, in conjunction with the fourth expansion chamber 45, constitute a bypass which connects the second expansion chamber 7 to the exhaust chamber 11.

According to this modification, like the first embodiment, the exhaust gas from the second expansion chamber 7 is mixed with the secondary air in the ejector section 5, and the resulting gas mixture is introduced into the catalyst 21. Meanwhile, some of the exhaust gas from the second expansion chamber 7 is introduced into the fourth expansion chamber 45 through the hole 41a in the partition plate 41, and then into the exhaust chamber 11 through the hole 44a in the partition plate 44. Thereupon, the introduced gas is mixed with the exhaust gas purified by the catalyst 21, and the resulting gas mixture is discharged into the atmosphere.

Thus, some of the exhaust gas flows between the outer casing 2a and the catalyst holder 42, thereby cooling a high-temperature portion heated by the heat of oxidative reaction from the catalyst 21. When this exhaust gas is mixed with the exhaust gas passed through the catalyst 21, moreover, excess oxygen is too little to cause a reactor reaction. Therefore, the individual parts of the apparatus can be prevented from undergoing an undue temperature rise, and the whole muffler can be kept at a relatively low temperature. Accordingly, it is unnecessary to use expensive heat-resisting alloy, so that the total cost can be reduced, and the safety and durability of the apparatus can be improved.

Figure 8:
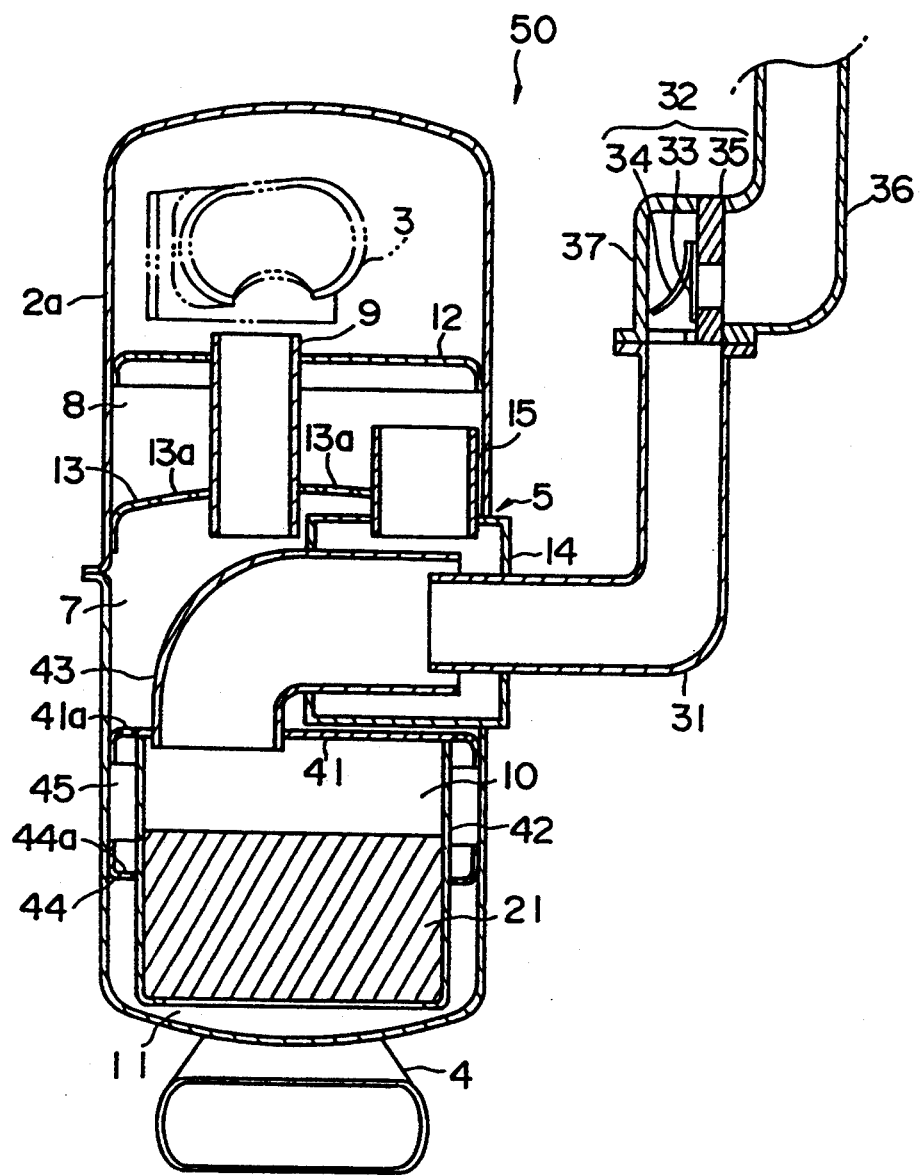
FIG. 8 is a sectional view of an engine exhaust apparatus according to a third modification of the first embodiment.

Referring now to FIG. 8, an exhaust apparatus according to a third modification of the first embodiment will be described.

In this third modification, as compared with the first modification in which the check valve is provided for the exhaust apparatus 1 of the first embodiment, a check valve is provided for the exhaust apparatus 40 of the second modification.

In the exhaust apparatus 50 of the third modification, as shown in FIG. 8, the air intake pipe 31 identical with that of the first modification is used for the ejector section 5. The check valve 32 identical with that of the first modification is provided in the extreme end of the pipe 31. Thus, the ejector effect can be heightened without entailing thermal damage attributable to the heat of oxidative reaction from the catalyst.

Although the ejector according to the aforementioned embodiment is designed so as to revolve the exhaust gas in a spiral, the present invention is not limited to this arrangement.

According to the first embodiment, as described above, the exhaust gas discharged from the engine is introduced into the sound deadening section in the muffler body, whereby the exhaust noise level is lowered. After the exhaust gas from the sound deadening section is guided into the ejector section and mixed with the secondary air, and is then introduced into the catalyst to be purified thereby. Therefore, the ejector effect cannot be lowered by the high-resistance sound deadening section. Thus, the ejector effect can be improved for efficient supply of the secondary air with use of a simple structure. Also, the exhaust noise level can be lowered at low cost.

Since the secondary air is introduced into the ejector section through the check valve, moreover, the ejector effect cannot be lowered by the positive exhaust pressure.

Furthermore, some of the exhaust gas from the sound suppressing section is allowed to bypass, and is guided to the region around the catalyst holder to cool the ambience of the catalyst. Accordingly, the muffler body can be restrained from undergoing high-temperature oxidative deterioration, so that it can enjoy improved durability and high reliability.

Figure 10:
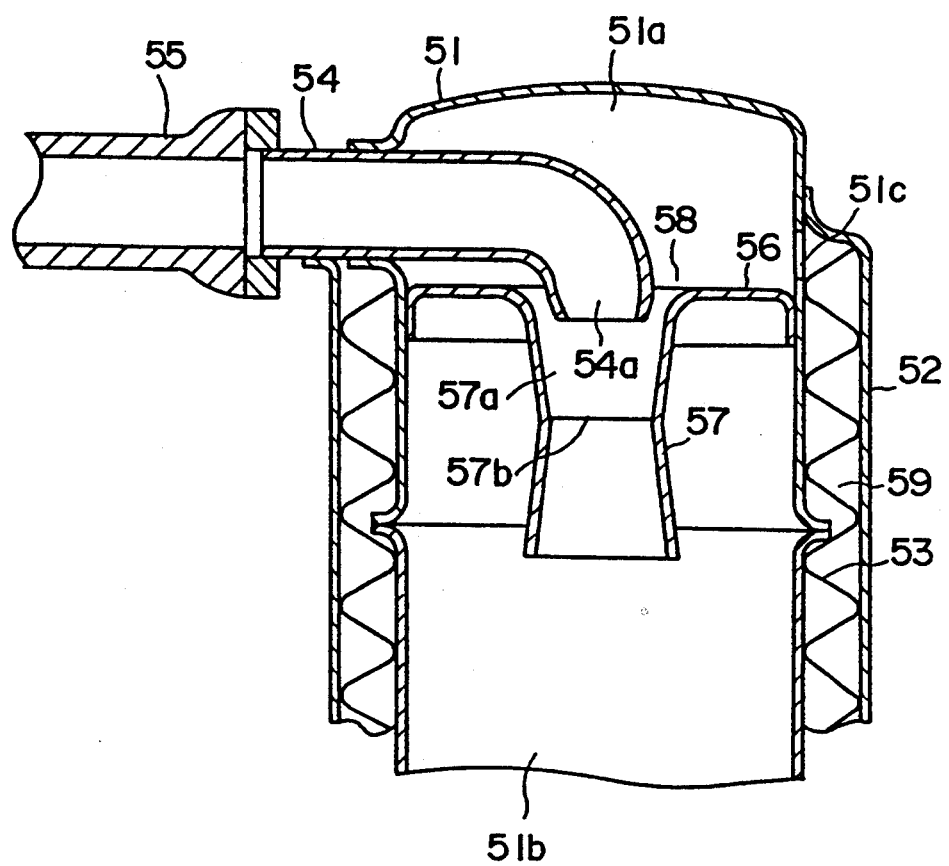
FIG. 10 is a sectional view of an engine exhaust apparatus according to a second embodiment of the present invention.

Referring now to FIG. 10, an exhaust apparatus according to a second embodiment of the present invention will be described.

In FIG. 10, numeral 51 denotes a muffler body, which is covered by a cover member 52. Sound suppressing means 53, such as a sound suppressing element, is sandwiched between the cover member 52 and the muffler body 51.

An exhaust pipe 54 is fixedly passed through the upstream portion of the muffler body 51. An inlet port of the exhaust pipe 54 is connected with a centralized end portion of an exhaust manifold 55, which communicates with an exhaust port of an engine.

The inside space of the muffler body 51 is divided into two parts, a secondary air intake chamber 51a and a sound deadening chamber 51b, by means of a partition member 56. A diffuser section 57 is formed substantially in the center of the partition member 56.

The diffuser section 57 includes a secondary air guide portion 57a and a throttle portion 57b.

Further, an exhaust nozzle 54a of the exhaust pipe 54, which is inserted in the muffler body 51, faces the secondary air guide portion 57a of the diffuser section 57. The diffuser section 57 and the exhaust nozzle 54a constitute an ejector section 58.

A secondary air intake passage 59 is defined between the muffler body 51 and the cover member 52. The passage 59 and the secondary air intake chamber 51a in the muffler body 51 communicate with each other by means of a secondary air intake port 51c, which is bored through the wall of the muffler body 51. A secondary air intake port (not shown) is bored through or opens in the lower part of the cover member 52.

The following is a description of the operation of the exhaust apparatus according to the second embodiment.

When an exhaust valve of the engine opens, the exhaust gas flows through the exhaust manifold 55 and the pipe 54, and rapidly runs out from the exhaust nozzle 54a in a manner such, that it is substantially adiabatically expanded. Thereupon, the exhaust gas is blown off into the throttle portion 57b of the diffuser section 57.

Based on the ejector effect, air in the secondary air intake chamber 51a is sucked in through the secondary air guide portion 57a of the diffuser section 57, and is fed together with the exhaust gas into the sound suppressing chamber 51b. Since the secondary air intake varies depending on the flow rate of the exhaust gas, a proper quantity of secondary air is always supplied to the sound suppressing chamber 51b.

As a result, the exhaust gas discharged from the exhaust nozzle 54a is cooled by the secondary air, so that the exhaust gas expansion is restrained, and therefore, the noise level is lowered. Also, the exhaust gas and the secondary air react each other in the sound deadening chamber 51b, whereby the exhaust gas is purified.

If the exhaust system is furnished with a treatment device, such as a catalyst or thermal reactor, the exhaust gas purification is accelerated by introducing a proper quantity of the secondary air.

On the other hand, the secondary air is introduced from the secondary air intake port (not shown), which is bored through or opens in the lower part of the cover member 52, into the secondary air intake chamber 51a of the muffler body 51 via the secondary air intake passage 59 and the secondary air intake port 51c of the muffler body 51.

The muffler body 51 is cooled as the secondary air flows through the secondary air intake passage 59. The muffler body 51, which is heated by the reaction heat between the exhaust gas and the secondary air, is restrained from undergoing oxidative deterioration by being cooled by the secondary air, and its durability is improved correspondingly.

Since the sound deadening means 53 is interposed between the muffler body 51 and the cover member 52, moreover, noises produced when the exhaust gas is suddenly expanded cannot be easily emanated to the outside. Thus, the sound suppressing effect can be attained.

In the case of an air-cooled engine, the muffler body 51 can be effectively cooled by being located in the path of cooling air from a cooling fan scrolling section.

Figure 11:
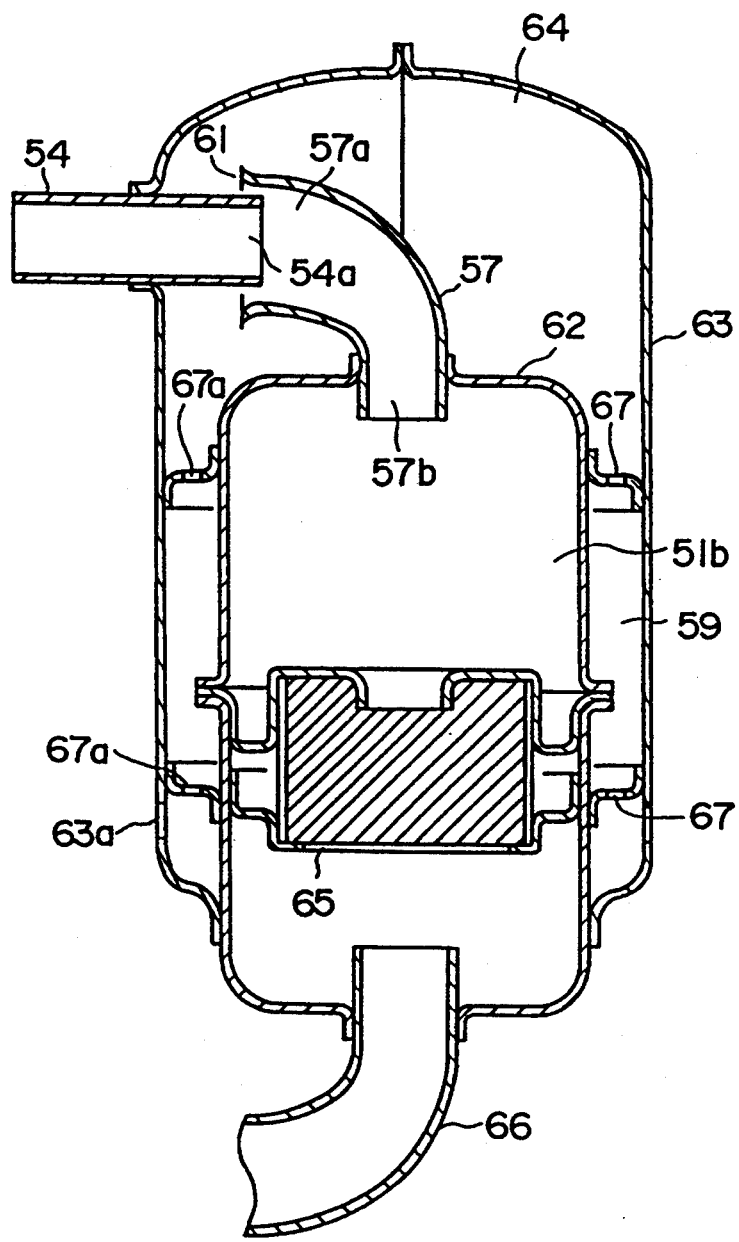
FIG. 11 is a sectional view of an engine exhaust apparatus according to a modification of the second embodiment.

Referring now to FIG. 11, an exhaust apparatus according to a modification of the second embodiment will be described.

In this modification, an ejector section 61, which is composed of the exhaust nozzle 54a and the diffuser section 57, is provided outside a muffler body 62, and the ejector section 61 and the muffler body 62 are covered by means of a cover member 63.

When the exhaust valve opens so that the exhaust gas flows through the exhaust manifold 55 (see FIG. 10) and runs out from the exhaust nozzle 54a of the exhaust pipe 54, the secondary air in a secondary air intake chamber 64, which is defined by the muffler body 62 and the cover member 63, is sucked in through the secondary air guide portion 57a of the diffuser section 57 by the ejector effect. This secondary air, along with the exhaust gas, is fed into the sound deadening chamber 51b through the throttle portion 57b, and reacts with the exhaust gas in the chamber 51b. Also, purification in a post-treatment device 65, such as a catalyst or thermal reactor, is accelerated.

The purified noise-down exhaust gas is discharged into the atmosphere through a tailpipe 66.

Meanwhile, the secondary air or outside air is introduced through a secondary air intake port 63a, which is bored through the lower part of the cover member 63, and is delivered into the secondary air intake chamber 64 via the secondary air intake passage 59, defined by the muffler body 62 and the cover member 63, and vent holes 67a bored through support members 67, which connects the body 62 and the member 63 and doubles as sound suppressing means.

The muffler body 62 is cooled as the secondary air flows through the secondary air intake passage 59, and noises attributable to the expansion of the exhaust gas delivered from the secondary air intake chamber 64 are shut off by the support members 67. Thus, the noises cannot be easily emanated to the outside, so that a sound suppressing effect can be obtained.

In this modification, moreover, the ejector section 61 is mounted on the outside of the muffler body 62. Accordingly, the relationships between the resistance of passage through the vent holes 67a in the support members 67 and the pressure and flow rate of the exhaust gas discharged from the exhaust nozzle 54a can be finely adjusted, so that a high ejector effect can be enjoyed.

The present invention is not limited to the embodiments described above. For example, the cover member may be designed so as to cover the front of the muffler body.

According to the second embodiment, as described above, the secondary air is introduced by utilizing the ejector effect produced when the exhaust gas is discharged, so that a proper quantity of secondary air can be supplied to the exhaust system with use of a simple arrangement.

Since the secondary air intake passage is defined between the muffler body and the cover member which covers at least a part of the outer periphery of the muffler body, moreover, the construction become simple, and the muffler body is cooled as the secondary air is introduced. Accordingly, the muffler body is restrained from undergoing oxidative deterioration, and its durability is improved.

Since the sound suppressing means is interposed between the muffler body and the cover member which covers at least a part of the outer periphery of the muffler body, furthermore, the noises produced by the sudden expansion of the exhaust gas cannot be easily emanated to the outside, so that the noise level of the exhaust system can be lowered.

Figure 12:
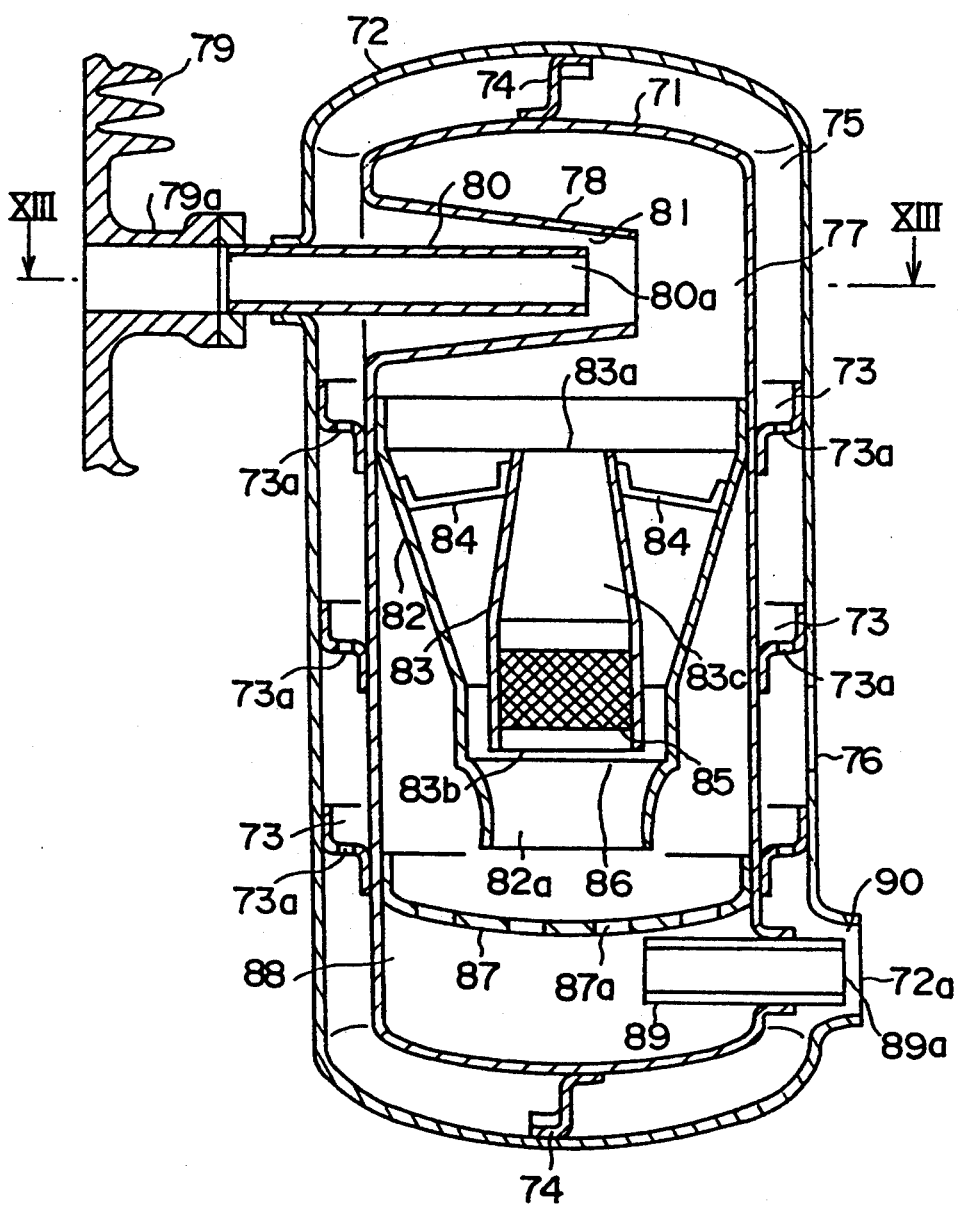
FIG. 12 is a sectional view of an engine exhaust apparatus according to a third embodiment of the present invention.
Figure 13:
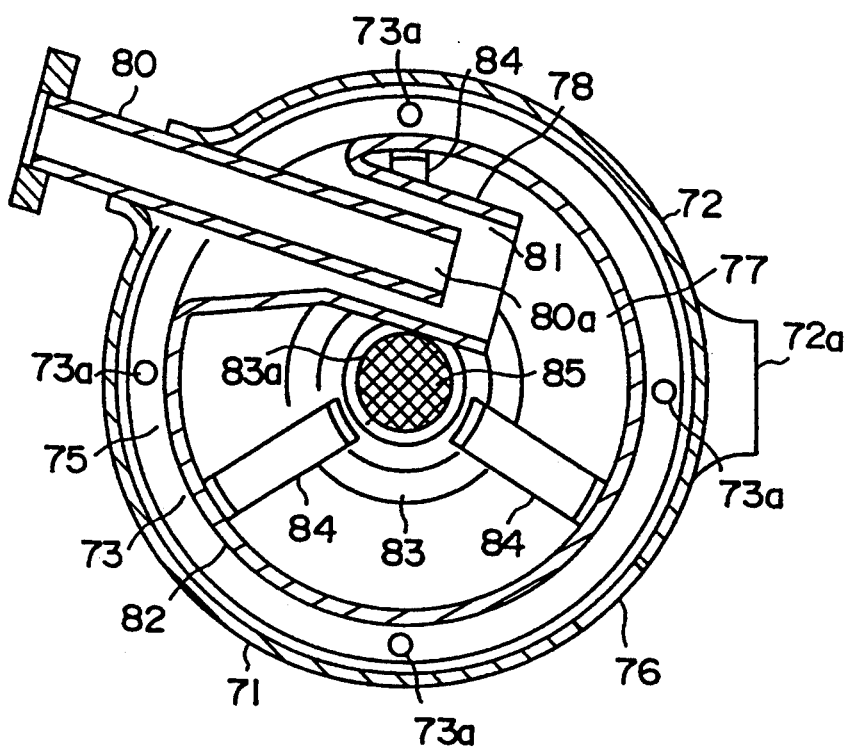
FIG. 13 is a sectional view taken along line XIII—XIII of FIG. 12.

Referring now to FIGS. 12 and 13, a third embodiment of the present invention will be described.

Generally, in industrial engines, e.g., two-cycle engines, of a type such that fuel and oil are burned in a mixed state, the exhaust gas contains unburned oil, which involves visible smoke and irritating smell, so that the engines are liable to be backward in measures to dispose of the exhaust gas.

Conventionally, a measure to counter the exhaust gas problem is described in U.S. Pat. No. 3,468,124, for example. According to this method, the secondary air is introduced into the exhaust system and caused to react by means of a thermal reactor. For an effective reaction, however, the exhaust gas must be kept at high temperature, so that its control is complicated and entails high cost.

In purifying the exhaust gas by means of a reactive member such as a catalyst, reaction of all the exhaust gas with use of the reactive member causes a serious toxic deterioration of the reactive member. Since the unburned oil is contained in the exhaust gas, moreover, the durability and reliability are not satisfactory.

The third embodiment is intended to provide an engine exhaust apparatus in which deterioration of the reactive member, such as a catalyst, can be restrained to accelerate the reactor reaction, so that the exhaust gas purification can be effected with high reliability.

In FIGS. 12 and 13, numeral 71 denotes a muffler body, which is covered by a cover member 72. The cover member 72 and the muffler body 71 are supportingly fixed to each other by means of upper, middle, and lower defining flanges 73, which are fixedly arranged at the peripheral side of the muffler body 71, and upper and lower fixed brackets 74. A secondary air intake passage 75 is defined between the cover member 72 and the muffler body 71. Vent holes 73a are bored through each flange 73, and a secondary air intake port 76 is bored through that portion of the cover member 72 which is situated between the middle and lower flanges 73.

Further, an oil separating chamber 77 is defined on the upstream portion of the muffler body 71. A diffuser section 78, which communicates with the secondary air intake passage 75, extends in the circumferential direction (tangential direction in the illustrated embodiment) from the peripheral side of the chamber 77. An exhaust pipe 80 is passed through the diffuser section 78 so as to communicate with an exhaust port 79a in a body 79 of a two-cycle engine and fix the cover member 72. An exhaust nozzle 80a at the distal end of the pipe 80 faces a region just behind a discharge port of the diffuser section 78. The nozzle 80a and the diffuser section 78 constitute a secondary air intake ejector section 81.

An oil guide section 82 in the form of an upwardly spread cone is disposed in the downstream portion of the oil separating chamber 77 of the muffler body 71. A reactor 83 is supported in the center of the guide section 82 by means of stays 84. A gas intake port 83a opens slightly constricted in the top end of the reactor 83, and a gas discharge port 83b opens in the bottom end. A reaction chamber 83c defined in the reactor 83 is loaded with a catalyst 85.

The lower end of the oil guide section 82 extends slightly constricted below the gas discharge port 83b of the reactor 83, thus forming a gas mixing section 82a. The mixing section 82a and the discharge port 83b constitute a gas mixing ejector section 86.

Under the oil guide section 82 of the muffler body 71, an exhaust chamber 88 is defined by a partition plate 87. A plurality of vent holes 87a are bored through the partition plate 87.

A tailpipe 89 protrudes outward from the peripheral side of the exhaust chamber 88. A discharge port 89a of the tailpipe 89 faces a muffler cooling diffuser section 72a which is formed on the cover member 72. The diffuser section 72a and the discharge port 89a constitute a muffler cooling ejector section 90.

The following is a description of the operation of the exhaust apparatus according to the third embodiment.

The exhaust gas discharged from the exhaust port 79a of the engine body 79 by the scavenging action of the two-cycle engine is rapidly discharged through the exhaust nozzle 80a of the exhaust pipe 80 into the oil separating chamber 77 in the upstream portion of the muffler body 71. The exhaust pipe 80 extends in the circumferential direction of the separating chamber 77. Therefore, the exhaust gas whirls along the side wall of the chamber 77, whereupon the unburned oil in the exhaust gas is separated from the gas and deposited on the inner surface of the wall by centrifugal force.

When the exhaust gas is discharged through the exhaust nozzle 80a of the exhaust pipe 80, the secondary air is sucked from the diffuser section 78 into the oil separating chamber 77 by the ejector effect.

This secondary air is introduced through the secondary air intake port 76 in the peripheral side of the cover member 72, and is fed through the secondary air intake passage 75 which is defined between the muffler body 71 and the cover member 72. Since the flanges 73 are arranged in the middle of the intake passage 75, the secondary air flows through the vent holes 73a in the flanges 73. In this arrangement, the flanges 73 serve to arrest sounds, so that the exhaust noises cannot easily leak out through the intake port 76. Thus, silent operation can be ensured.

When the exhaust gas rapidly whirls, the exhaust gas without the unburned oil therein collects in the center of the oil separating chamber 77. Some of this exhaust gas, along with the secondary air, flows into the reaction chamber 83c of the reactor 83, which is located substantially in the center. Oxidative reaction occurs as the exhaust gas passes through the catalyst 85 in the reaction chamber 83c.

The remainder of the exhaust gas having failed to pass through the reactor 83, along with the separated unburned oil, is guided in rapid whirls along a slope of the oil guide section 82 around the reactor 83 into the gas mixing section 82a.

Thereupon, the exhaust gas, purified in the reaction chamber 83c and heated to high temperature by the reaction heat, is sucked by the ejector effect from the discharge port 83b of the reactor 83, which opens over the gas mixing section 82a.

As a result, the unburned oil and the exhaust gas heated by the heat of reaction are mixed to cause the reactor reaction in the gas mixing section 82a, and hydrocarbon and carbon monoxide are eliminated by oxidative reaction. At the same time, the unburned oil is burned and flows through the vent holes 87a in the partition plate 87 into the exhaust chamber 88, which is formed in the downstream portion of the muffler body 71. Then, the oil is discharged into the atmosphere through the discharge port 89a of the tailpipe 89 which passes through the side wall of the chamber 88.

In the meantime, the secondary air in the secondary air intake passage 75 is sucked and discharged by the ejector effect from the muffler cooling diffuser section 72a of the cover member 72, in which the discharge port 89a of the tailpipe 89 is loosely fitted. As a result, the muffler body 71 is cooled by the secondary air, so that its high-temperature deterioration can be restrained.

The catalyst 85 can be restrained from advancing its deterioration and improved in durability by adjusting the opening area of the gas intake port 83a of the reactor 83 so that the quantity of the exhaust gas passing through the reactor 83 is a minimum necessary quantity which is sufficient for the reaction in the gas mixing section 82a.

According to the third embodiment, as described above, when the exhaust gas is discharged from the exhaust nozzle, which extends in the circumferential direction so as to face the oil separating chamber in the upstream portion of the muffler body, the discharged gas whirls, so that the unburned oil in the gas is separated by centrifugal force.

Also, the secondary air is introduced by the ejector effect into the oil separating chamber through the exhaust nozzle and the diffuser section which surrounds the nozzle.

The exhaust gas cleared of the unburned oil flows into the reaction chamber in the center of the downstream portion of the oil separating chamber, whereupon it is purified by reaction.

On the other hand, the oil separated in the oil separating chamber and the whirling exhaust gas are guided in rapid whirls along the oil guide section into the gas discharge port of the reaction chamber. Then, the exhaust gas, purified in the reaction chamber by the ejector effect and heated to high temperature by the heat of reaction, is sucked from the discharge port, the unaffected exhaust gas is purified by the reaction, and the oil is burned.

In this manner, the exhaust gas cleared of the unburned oil is heated to high temperature by reaction, and the unaffected exhaust gas is subjected to reactor reaction by the high-temperature exhaust gas and the introduced secondary air, whereby the unaffected gas is purified, and the unburned oil is burned. Thus, the exhaust gas can be discharged to the atmosphere without visible smoke and irritating smell, that is, high-reliability exhaust gas purification can be effected.

Furthermore, the quantity of the exhaust gas passed through the reactive member must only be just large enough for the reactor reaction of the unaffected exhaust gas, and the exhaust gas fed into the reaction chamber contains no unburned oil. Thus, deterioration is restrained to ensure improved durability and high reliability.

While the presently preferred embodiments of the present invention have been shown and described, it is to be understood that the disclosure are for the purpose of illustration and that various changes and modifications may be made without departing from the scope of the invention as set forth in the appended claims.

What is claimed is:

1. An engine exhaust apparatus for purifying an exhaust gas discharged from an exhaust port of an engine and lowering the exhaust noise level, said apparatus comprising:
   a sound suppressing section for lowering the exhaust noise level as the exhaust gas discharged from the exhaust port passes through the sound suppressing section;
   an ejector section for introducing secondary air into the exhaust gas delivered from the sound suppressing section and mixing the secondary air and the exhaust gas so as to cool said whole exhaust apparatus by inducing said secondary air through ejecting effect of said exhaust gas; and
   a post-treatment section for purifying the gas mixture delivered from the ejector section so as to completely purify said exhaust gas in a simple structure.

2. The engine exhaust apparatus according to claim 1, wherein said sound suppressing section includes:
   a first expansion chamber for receiving the exhaust gas;
   a second expansion chamber communicating with the first expansion chamber by a guide pipe; and
   a third expansion chamber defined between the first and second expansion chambers and communicating with the second expansion chamber.

3. The engine exhaust apparatus according to claim 1, wherein said ejector section includes:
   a barrel member;
   an exhaust gas intake pipe connecting the barrel member and the sound suppressing section;
   an air intake pipe for externally introducing the secondary air; and a diffuser pipe for mixing the secondary air and the exhaust gas and guiding the resulting gas mixture into the post-treatment section.

4. The engine exhaust apparatus according to claim 3, wherein said exhaust gas intake pipe intersects the central axis of the barrel member at right angles thereto so that the exhaust gas introduced into the barrel member swirls in an accelerating flow.

5. The engine exhaust apparatus according to claim 3, further comprising:

a check valve in the air intake pipe for preventing the unpurified exhaust gas from being discharged into the atmosphere through the air intake pipe.

6. The engine exhaust apparatus according to claim 3, further comprising:

a fourth expansion chamber defined adjacent to said post-treatment section and guiding some of the exhaust gas from the second expansion chamber into a discharge port whereby the exhaust gas from the second expansion chamber is mixed with the secondary air in the ejector section, and the resulting gas mixture is introduced into the catalyst, while some of the exhaust gas from the second expansion chamber is introduced into the fourth expansion chamber, and then into the exhaust chamber, so that the introduced gas is mixed with the exhaust gas purified by the catalyst, and the resulting gas mixture is discharged into the atmosphere.

7. An engine exhaust apparatus according to claim 1 further comprising:

a cover member covering at least a part of the body of the exhaust apparatus in a manner such that an intake passage for introducing secondary air is defined between the cover member and the apparatus body so as to cool said apparatus body;

sound suppressing means set in the intake passage;

wherein said ejector section is for feeding the secondary air from the intake passage into the exhaust gas discharged from the exhaust port and mixing the secondary air and the exhaust gas.

8. The engine exhaust apparatus according to claim 7, wherein said ejector section includes:

an exhaust nozzle for delivering the exhaust gas discharged from the exhaust port; and a diffuser surrounding the exhaust nozzle and used to introduce the secondary air from the intake passage into the region around the exhaust nozzle so that the exhaust gas and the secondary air are mixed, and to discharge the resulting mixture into the post-treatment section.

9. The engine exhaust apparatus according to claim 7, wherein said exhaust gas discharged from the exhaust port contains oil, and said apparatus further comprising:

an oil separating chamber for separating the oil from the exhaust gas from the exhaust port by whirling the exhaust gas.

10. The engine exhaust apparatus according to claim 9, wherein said ejector section includes:

an exhaust nozzle for delivering the exhaust gas discharged from the exhaust port; and a diffuser surrounding the exhaust nozzle and used to introduce the secondary air from the intake passage into the region around the exhaust nozzle so that the exhaust gas and the secondary air are mixed, and to discharge the resulting mixture into the oil separating chamber.

11. The engine exhaust apparatus according to claim 10, wherein said post-treatment section includes:

a reactor for purifying some of the exhaust gas discharged from the oil separating chamber.

12. The engine exhaust apparatus according to claim 11, wherein said post-treatment section includes:

guide means for guiding unburned oil separated from the soil separating chamber; and combustion means for burning the unburned oil guided by the guide means.

13. The engine exhaust apparatus according to claim 11, wherein the secondary air in the secondary air intake passage is sucked and discharged by the ejector effect from the muffler cooling diffuser section of the cover member, in which the discharge port of the tailpipe is loosely fitted, whereby the muffler body is cooled by the secondary air, so that its high-temperature deterioration can be restrained.

* * * * *